United States Patent [19]
Rush et al.

[11] Patent Number: 5,641,524
[45] Date of Patent: Jun. 24, 1997

[54] METHOD AND APPARATUS FOR VACUUM/PRESSURE THERMOFORMING

[75] Inventors: Jonathan E. Rush, Phillipsburg, N.J.; John R. Johnson, Lexington, Ky.

[73] Assignee: James River Corporation of Virginia, Richmond, Va.

[21] Appl. No.: 474,664

[22] Filed: Jun. 7, 1995

Related U.S. Application Data

[62] Division of Ser. No. 230,887, Apr. 20, 1994, abandoned, which is a continuation of Ser. No. 923,507, Aug. 3, 1992, abandoned.

[51] Int. Cl.$^6$ .......................... B29C 51/06; B29C 51/10
[52] U.S. Cl. ..................... 425/384; 425/387.1; 425/388; 264/40.3; 264/549; 264/550
[58] Field of Search ............................ 425/387.1, 388, 425/149, 384; 264/549, 550, 40.3

[56] References Cited

U.S. PATENT DOCUMENTS

| | | |
|---|---|---|
| 2,973,558 | 3/1961 | Stratton, Jr. . |
| 2,990,581 | 7/1961 | Rowe, Jr. . |
| 3,218,379 | 11/1965 | Edwards . |
| 3,338,997 | 8/1967 | Tigner . |
| 3,342,914 | 9/1967 | Edwards . |
| 3,441,983 | 5/1969 | Cheney . |
| 3,749,542 | 7/1973 | Shelby ............................ 425/388 |
| 3,814,784 | 6/1974 | Wolf . |
| 4,382,767 | 5/1983 | Naugle et al. ............................ 425/504 |
| 4,443,401 | 4/1984 | Turner . |
| 4,500,277 | 2/1985 | Bullock et al. ............................ 425/388 |
| 4,536,148 | 8/1985 | Murley et al. . |
| 4,595,554 | 6/1986 | Bullock et al. . |
| 4,636,349 | 1/1987 | MacLaughlin ............................ 264/549 |
| 4,668,175 | 5/1987 | Martin ............................ 425/388 |
| 4,878,826 | 11/1989 | Wendt ............................ 425/388 |

*Primary Examiner*—Khanh P. Nguyen
*Attorney, Agent, or Firm*—Sixbey, Friedman, Leedom & Ferguson, P.C.; Charles M. Leedom, Jr.; Donald R. Studebaker

[57] ABSTRACT

An apparatus for plug-assisted thermoforming of a cup or other hollow article has a concave well or cone region machined into its top with a series of small holes drilled near the deepest part of the well and connected to a port inside the plug which is connected to a specifically sized manifold system. The manifold has a source for positive (pneumatic) and negative (vacuum) pressure air. During the machine cycle, a vacuum is introduced into the plug, which draws the hot plastic sheet into the plug well to stretch it. The vacuum is replaced by compressed air to transfer the pre-stretched sheet into a mold. In a particularly preferred embodiment, the plug is shaped to provide stretching in both the central well and in peripheral regions concentric with the well. Controlled air pressure in the mold may be used to provide the concentric prestretching.

17 Claims, 7 Drawing Sheets

METHOD AND APPARATUS FOR VACUUM/PRESSURE THERMOFORMING

This is a divisional application of Ser. No. 08/230,887, filed Apr. 20, 1994 now abandoned which is a continuation of Ser. No. 07/923,507, filed Aug. 3, 1992, now abandoned.

FIELD OF THE INVENTION

The present invention relates to methods and apparatus for thermoforming a hollow article such as a plastic drinking cup.

BACKGROUND OF THE INVENTION

Plug-assist vacuum thermoforming, in which generally concave, hollow articles such as plastic cups are formed from sheets of plastic material, is well known in the art. In such processes, a sheet of thermoplastic resin is softened by heating, clamped in a frame, and then a tapered, blunt-nosed plug member is used to push the sheet down into the die, usually from 60% to 95% of the way in. Then, vacuum is applied through pores in the die surface to pull the sheet off the plug and down against the die surface. The plug is usually heated to produce slipping of the softened sheet over the surface of the plug as the plug stretches the sheet. A problem occurs when the sheet is of a material which will not slip well across the plug, and when a relatively deep item is to be formed, resulting in portions of the sheet being drawn thin while other portions, particularly on the bottom of the plug, remain at their original thickness. As a result, a thick section is formed at the bottom of the article, and the sides of the article, particularly where they join the bottom, are relatively thin, resulting in structural weakness. This variation in thickness becomes particularly objectionable when forming premium, heavy-weight plastic cups.

Further, even in plastic cups of typical thickness, an increased amount of material must be used to maintain minimum strength levels to overcome these thickness variations produced by the forming process. The rigidity of a plastic cup depends largely on the thickness of the side wall. Thus, if excess material weight could be removed from the bottom of the cup and relocated into the side walls, overall material savings and weight reduction might be realized while maintaining the same rigidity.

One early effort to address this problem is disclosed in U.S. Pat. No. 2,990,581 to Rowe, Jr. which shows a plug assisted vacuum thermoforming process wherein the plug has a deep cone-shaped central well as shown in FIGS. 2 and 3 of that patent. In one embodiment, a port at the apex of the cone supplies a vacuum during the descent of the plug into the forming die to "predraw" the central portion of the sheet which will form the bottom of the thermoformed article. The Rowe device does not disclose using air pressure to predraw any other regions of the sheet, such as the areas forming the sides of a cup, and the Rowe plug port does not perform any material ejection function.

U.S. Pat. No. 3,814,784 to Wolf discloses a plug assisted thermoforming method and a plug which includes a passage connected to a source of reduced and superatmospheric pressure. When the plug is connected to the reduced pressure source, the plastic sheet being thermoformed is pulled against the plug. The plug disclosed by this patent does not have a central well, but instead has a substantially rectangular configuration. Moreover, the plug does not prestretch the plastic sheet in this process.

U.S. Pat. No. 2,973,558 to Stratton, Jr. and U.S. Pat. No. 4,443,401 to Turner disclose plug assist methods for thermoforming containers in which the plastic is pre-stretched prior to its introduction into the mold. In both these methods, however, the sheet is stretched only by pressurized air directed from the mold. A vacuum is not applied to the plug to produce the pre-stretching.

U.S. Pat. No. 3,342,914 to Edwards discloses a porous mandrel or plug (FIGS. 10-13) through which a vacuum is broadly applied to pull a plastic sheet to the shape of the plug while it is being directed into a corresponding shaped mold. The plastic is not pre-stretched by the tip of the plug prior to directing it into the mold.

U.S. Pat. No. 3,441,983 to Cheney discloses the controlled pre-stretching of a plastic sheet by the application of positive and negative pressure air to produce a container with a uniform wall thickness, but does not disclose a plug-assisted method or a concentric wave prestretching pattern.

However, prior art plugs and plug-assisted methods of the types shown in these documents did not provide a fully optimal uniform distribution of material in formed articles, and further did not provide optimal processing speed. Therefore, there is a need for an improved plug and plug-assisted process for thermoforming of hollow articles.

SUMMARY OF THE INVENTION

Therefore, it is a general object of the present invention to provide a novel and improved apparatus for prestretching sheets used in plug-assisted vacuum thermoforming of hollow articles.

Another general object of the present invention is to provide a novel and improved process for plug assisted vacuum thermoforming of hollow articles.

A more specific object of the present invention is to provide a novel and improved thermoforming apparatus including a plug with a concave end region in which both vacuum and positive air pressure may be selectively applied.

Another object of the present invention is to provide a novel and improved plug-assisted thermoforming apparatus wherein the plug has a concave end region joined by a surrounding convex surface to a substantially vertical side wall.

Yet another object of the present invention is to provide a novel and improved plug assisted thermoforming apparatus and method in which vacuum is applied through a passage internal to the plug to a concave end region of the plug to draw in and thus prestretch a thermoformed sheet, after which positive pressure is applied to the same region to force the prestretched portion into a mold.

A further object of the present invention is to provide a novel and improved plug-assisted thermoforming apparatus and method in which a thermoformed sheet is prestretched in a concentric wave pattern.

Other objects and advantages of the present invention will be apparent to those skilled in the art upon review of the specification, drawings, and claims.

These objects and other are achieved through an apparatus and method for plug-assisted thermoforming of a cup or other hollow article. In a preferred embodiment, the plug has a concave well or cone region machined into its top with a series of small holes drilled near the deepest part of the well and connected to a port inside the plug which is connected to a specifically sized manifold system. The manifold has a source for positive (pneumatic) and negative (vacuum) pressure air. During the machine cycle, a vacuum is introduced into the plug, which draws the hot plastic sheet into the plug well to stretch it. The vacuum is replaced by compressed air to transfer the pre-stretched sheet into a mold. In a further preferred embodiment, the plug is shaped to provide stretching in both the central well and in peripheral regions concentric with the well. Controlled air pressure in the mold may be used to provide the concentric pre-stretching. In each embodiment, cycle timing and pressures control the sequence of operations. The method and apparatus improves caliper balance between the product bottom and side wall, and material savings and improved structural strength are also obtained.

BRIEF SUMMARY OF THE DRAWINGS

FIG. 2a is a side sectional view of the plug apparatus; FIG. 2b is a bottom view; and FIG. 2c is a top view showing the plurality of air passages communicating between the inside and outside of the plug.

DETAILED DESCRIPTION OF THE PREFERRED EMBODIMENTS

The present invention relates to a method and apparatus for improved plug-assisted thermoforming of concave articles, such as plastic drinking cups.

Figure 1:
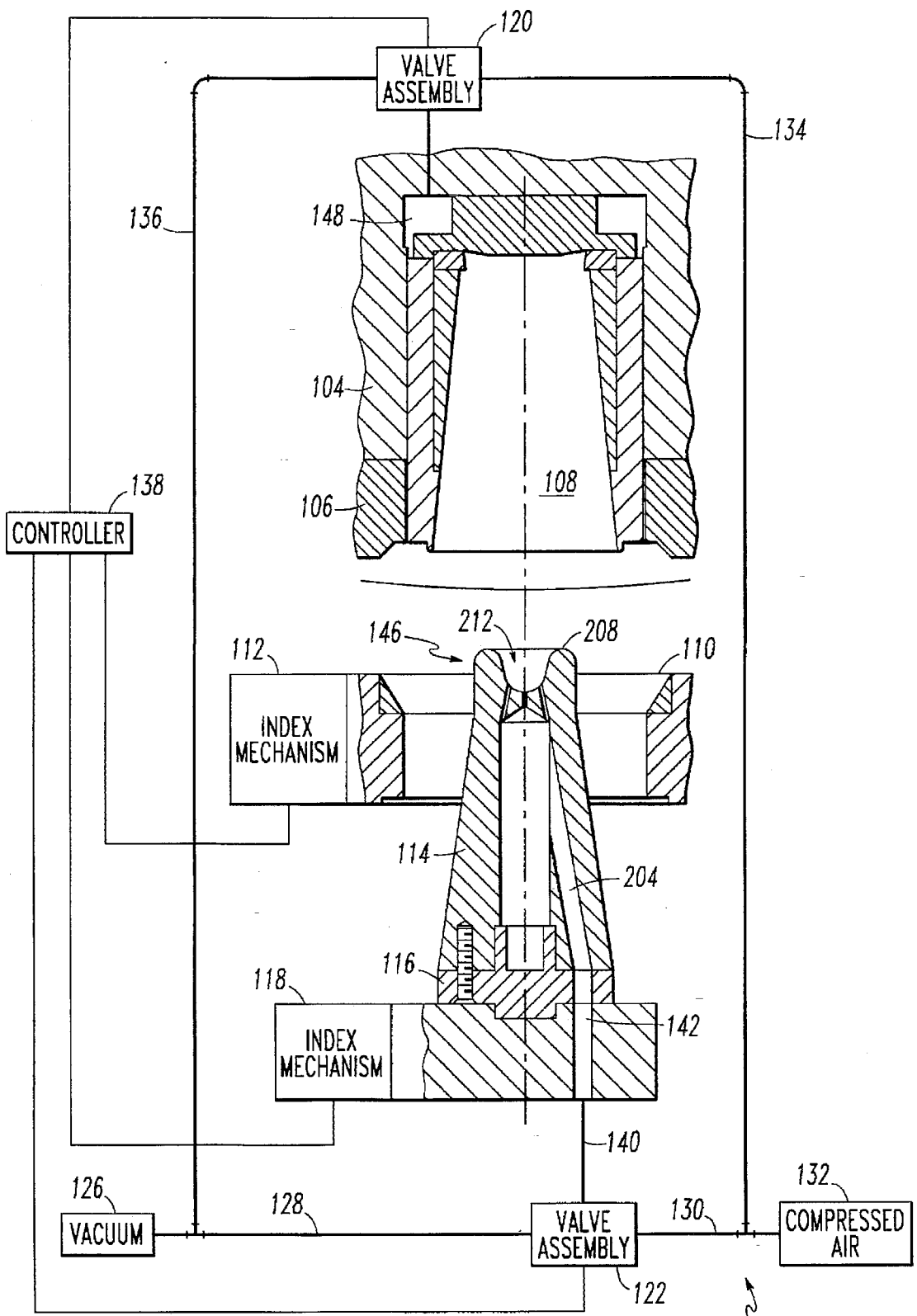
FIG. 1 is a block-schematic diagram of a preferred embodiment of the apparatus of the present invention.

FIG. 1 is a block schematic diagram showing generally a thermoforming system 102 according to a preferred embodiment of the present invention. The thermoforming system 102 comprises a mold bed 104 with mold cavity 108, stripping mechanism 106, clamp 110, index mechanisms 112 and 118, plug 114, plug base 116, valve assemblies 120 and 122, vacuum source 126, compressed air source 132, and controller 138.

Mold bed 104 has a mold cavity 108 in the shape of the article to be produced by thermoforming system 102. Stripping mechanism 106 is associated with mold bed 104 and located at the open end of mold cavity 108. Stripping mechanism 106 is movable in the direction away from mold cavity 108 by a conventional mechanism which is omitted from the drawing for clarity, to thereby selectively dislodge an article from mold cavity 108 after the forming process is complete. Clamp 110 can be moved along the central longitudinal axis of mold bed 104 and plug 114 by a conventional index mechanism 112 to peripherally clamp a thermoplastic sheet 124 against mold bed 104 and stripping mechanism 106. Plug 114 is mounted to a plug base 116 which is connected to an index mechanism 118 for moving plug 114 selectively into and out of mold cavity 108 along the central longitudinal axis of mold cavity 108 and plug 114.

Plug 114 is provided with an internal air passage 204 mating with an air passage 142 and plug base 116. Air passage 204 is connected by holes 208 to a concave region 212 formed in plug end 146 of plug 114.

Although in the embodiment shown index mechanisms 112 and 118 are provided for moving clamp 110 and plug 114 respectively relative to a fixed mold bed 104, those skilled in the art will appreciate that what is important is that relative controlled movement of the components be provided, and that other methods could be used to provide the necessary relative movement between these components. Any one component may be fixed in position, with the other components movable. For example, plug 114 could be fixed and mold bed 104 and clamp 110 could be moved relative to the fixed plug 114. Or, all of the components could be movable. Also, while a single mold cavity 108 and plug 114 are shown, typically a number of these units will be provided in a single system to simultaneously form a number of similar or dissimilar articles as desired.

Air passage 142 is attached to manifold 140 which is connected to valve assembly 122. Valve assembly 122 is connected by vacuum pipe 128 to vacuum source 126. Valve assembly 122 is also connected by compressed air pipe to compressed air source 132. Valve assembly 122 provides a means for selectively alternatively applying either vacuum from vacuum source 126 or compressed air from compressed air source 132 to concave region 212 of plug 114.

Valve assembly 122 may comprise two conventional solenoid valves connected respectively between vacuum pipe 128 and compressed air pipe 130, and the manifold 140. Control inputs for the solenoid valves of valve assembly 122 are connected to controller 138, which is preferably a programmable digital process control system designed to control the timing and operation of thermoforming system 102. Again, a single connection of valve assembly 122 to manifold 140 is shown, but it should be understood that when a plurality of mold cavities 108 and plugs 114 are provided in a single thermoforming system 102, manifold 140 may be connected to a plurality of plugs 114 and operatively connected to valve assembly 122 so that the desired pressure can be provided in manifold 140 and thus at each of the concave regions 212 of plugs 114. Although less preferred because of increased cost and complexity, a plurality of valve assemblies 122 could also be provided if desired to control the pressure provided to a plurality of manifolds 140 connected respectively to plugs 114.

Controller 138 is preferably a programmable, microprocessor-based control system designed and connected for use with a thermoforming apparatus, such as a Thermoformer Computer control System (TCS) manufactured by Brown Machine Co. As shown in FIG. 1, controller 138 is connected to valve assemblies 120 and 122 and to index mechanisms 112 and 118 for control thereof. Similarly, although omitted from the drawing Figure for clarity, controller 138 may be connected to feedback and monitoring sensors for sensing the operational status of thermoforming system 102. Preferably, these feedback and monitoring sensors will include finite adjustment positional encoders for sensing the relative positions of the movable components of system 102. Typically, controller 138 may also be operably connected to material loading and unloading mechanisms, temperature control mechanisms, and other elements associated with thermoforming system 102 to monitor and control the operation thereof. Controller 138 is preferably programmed to control valve assemblies 120 and 122 and the relative movement of plug 114, clamp 110, and mold bed 104 to provide the method of operation described below with reference to FIGS. 3a through 3e.

Valve assembly 120 is operatively connected to an air passage 148 of mold bed 104 and to vacuum pipe 136 and compressed air pipe 134, which are connected to vacuum source 126 and compressed air source 132 respectively. Valve assembly 120 is also connected by control lines to controller 138. In general, valve assembly 120 is constructed from conventional valve units such as solenoid valves, and operates to selectively provide either vacuum (from vacuum source 126) or compressed air (from compressed air source 132) to the air passage 148. The air passage 148 is connected by a plurality of small diameter holes or thin cracks to mold cavity 108. In general the holes may be of approximately 0.020 inch diameter and cracks, if used, may be on the order of 0.010 inch in width. In general, the holes 208 in plug 114 will have similar dimensions. The dimensions of the holes or cracks are chosen to be large enough to permit application of vacuum or pressure through the holes or cracks, but small enough to prevent drawing of plastic material into the holes when vacuum is applied thereto. If plastic material enters the holes, the sheet will be deformed and the resulting thermoformed article may show markings or surface irregularities corresponding to the holes or cracks, which is less desirable.

Preferably, valve assembly 120 will have a variable control or multiple step valve assembly connecting vacuum pipe 136 to air passage 148 so that a high level of vacuum from vacuum source 126 may be applied, and so that a lesser, "vacuum bleed" level of vacuum may also be applied. As will be seen, this vacuum bleed mode can be used to limit the rate of escape of air from mold cavity 108 so that when the vacuum bleed mode is activated and plug 114 indexes to force sheet 124 into mold cavity 108, a positive air pressure is created by the resulting compression of air in mold cavity 108 since the air is not entirely free to escape. As will be seen, this positive air pressure in mold cavity 108 can be used advantageously to enhance prestretching of sheet 124.

Figure 2A:
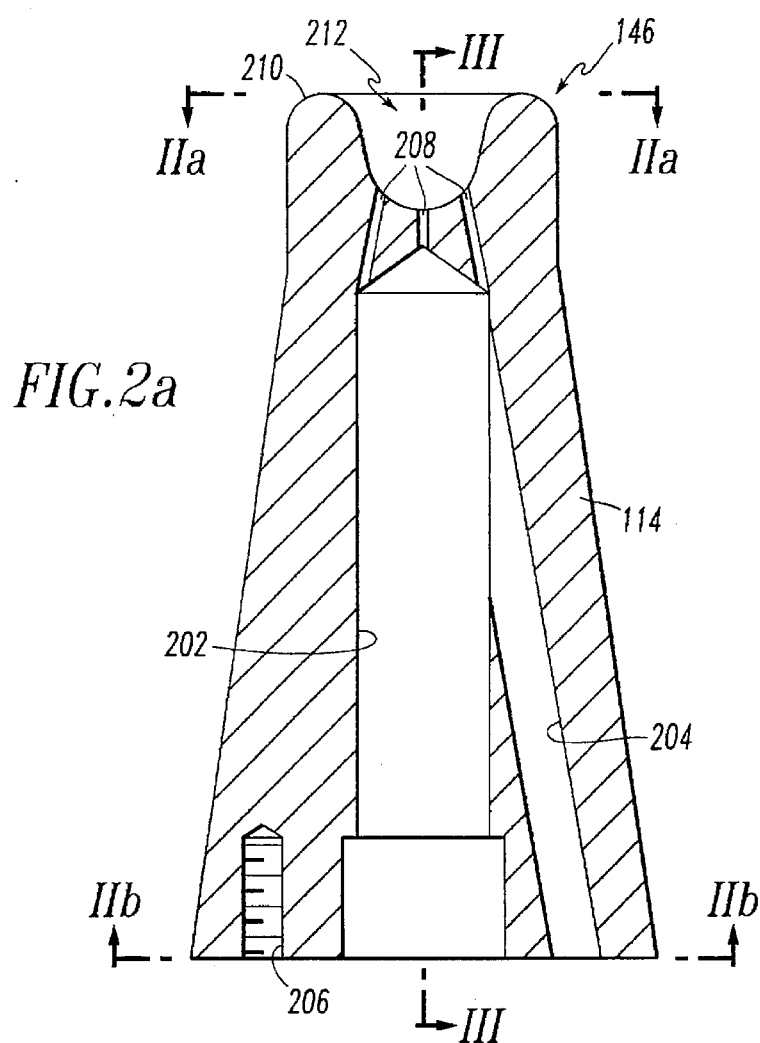
FIGS. 2a, 2b, and 2c are views of the plug apparatus according to the present invention.
Figure 2B:
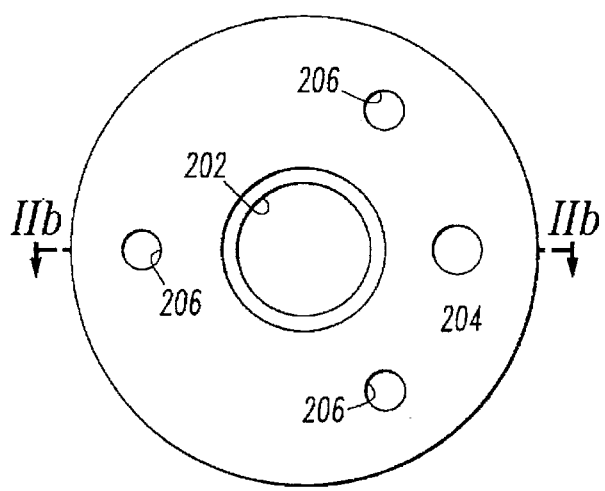
Figure 2C:
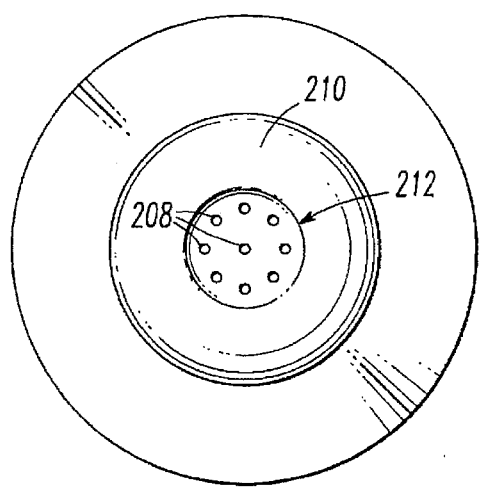

FIGS. 2a, 2b, and 2c show one embodiment of plug 114 in side section, bottom, and top views respectively. Referring now to FIG. 2a, this embodiment of plug 114 is generally in the shape of the frustrum of a cone. Plug 114 may be manufactured, for example, of either coated or uncoated solid aluminum, or a synthetic insulating material such as syntactic foam. At the plug end 146 of plug 114, a concave region 212 is provided by machining or other forming process performed on plug 114. Concave region 212 is surrounded by a convex region 210 which smoothly connects concave region 212 with the frusto-conical side of plug 114. A central internal hole 202 is drilled or otherwise formed in plug 114. Holes 208 are drilled or otherwise formed in concave region 212 to communicate between hole 202 and concave region 212. Air passage 204 is formed, again preferably by drilling, at an angle to connect central hole 202 and the bottom of plug 114. One or more threaded holes 206 may be provided in the bottom of plug 114 to receive mounting bolts for connecting plug 114 to plug base 116 (shown in FIG. 1).

FIG. 2c is a top view of plug 114 showing the arrangement of central concave region 212 and the peripherally surrounding convex region 210 which smoothly connects concave region 212 with the outer surface of plug 114. In general, a plurality of holes 208 are provided. As illustrated in FIG. 2c, a preferred embodiment provides nine holes 208, with eight holes spaced about the circumference of a circle of defined radius and a ninth hole at the center of the circle and spaced from the other holes by the circle radius. The holes preferably have a diameter of 0.024 inches. In another embodiment not shown in the Figure, a series of longitudinal slots (cracks) 0.010 inch across could be provided. The provision of a plurality of holes or cracks is particularly advantageous in that it permits fast evacuation or pressurization of the concave region 212, without making the hole or crack size so large that the finished product is marked by contact with the holes or cracks. An approximately equal spacing of holes over a broad area of the surface of concave region 212, as shown in FIG. 2c, seems to provide a desirable uniform prestretching action.

The operation of thermoforming system 102 will now be described with particular reference to FIGS. 3a–3e which are sectional diagrams showing consecutive stages in the preferred method of operation of thermoforming system 102.

Figure 3A:
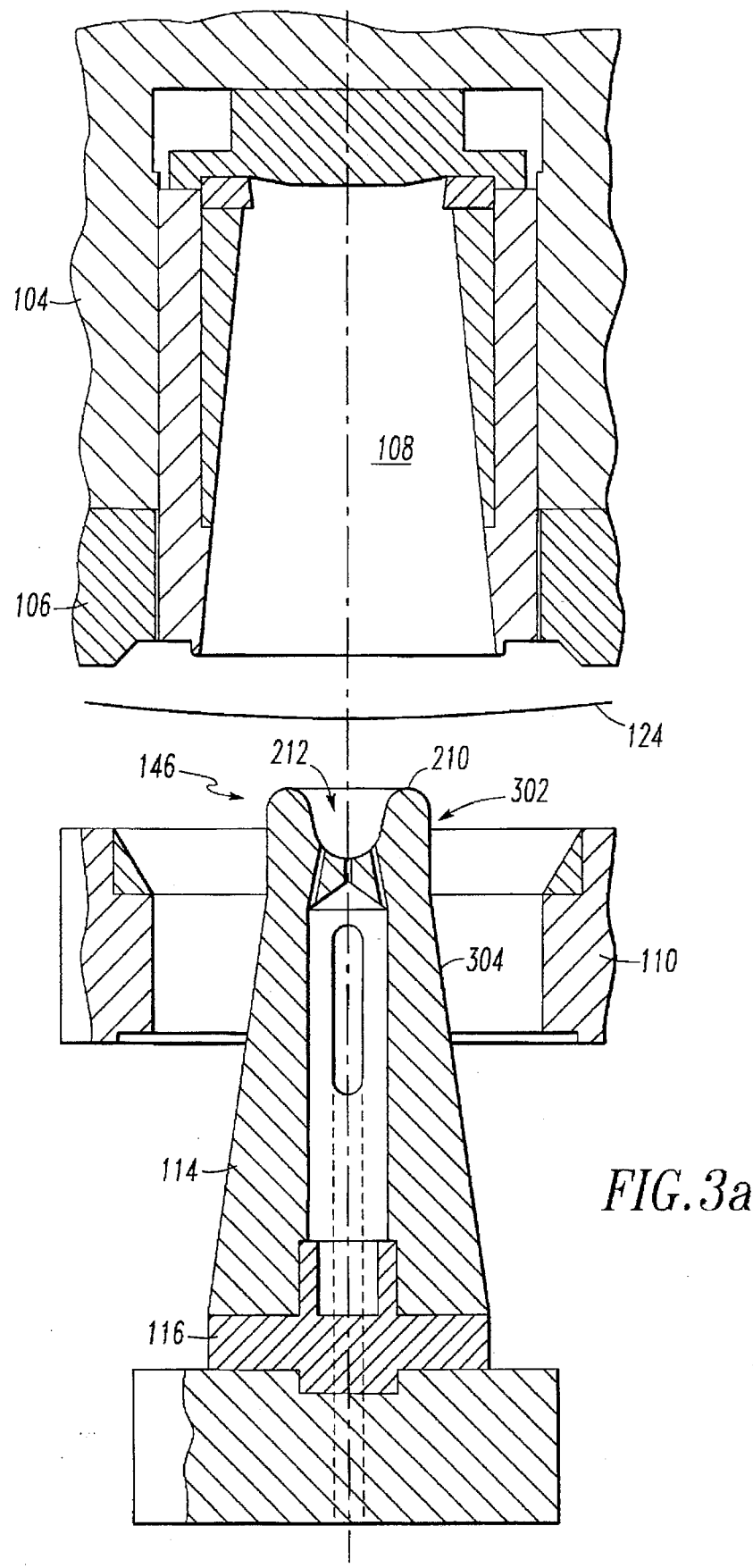
FIGS. 3a through 3e are sectional diagrams showing the plug, clamp, and mold apparatus of the present invention in five stages of process operation according to the present invention.

Initially, it should be noted that FIG. 3a illustrates a particularly preferred embodiment of plug 114 in which plug end 146 of plug 114 has at its periphery a substantially cylindrical sidewall portion 302 located between convex region 210 and a frusto-conical sidewall portion 304 of plug 114. In this preferred embodiment, frusto-conical sidewall portion 304 substantially complements the angular orientation of the sidewall of mold cavity 108 so that the frusto-conical sidewall portion 304 is roughly parallel to the wall of mold cavity 108 in this area when plug 114 is fully indexed into mold cavity 108. This configuration of plug 114, with its relatively steep, nearly vertical cylindrical sidewall portion 302, has been found to provide an improved distribution of material in the finished product produced using the illustrated plug 114. It is believed that this configuration of plug generates less interference with the concentric ring of material which, as will be seen, is preferably stretched in a billow forming stage in the area immediately adjacent to cylindrical sidewall portion 302. This reduced interference is believed to produce a greater stretching of the material of sheet 124, which results in a more uniform material distribution in the finished thermoformed product.

The process of operation of the apparatus of the present invention will now be described in detail with reference to FIGS. 3a through 3e, which are sectional diagrams showing the plug, clamp, and mold apparatus of the present invention in five stages of process operation, according to a preferred embodiment of the present invention.

FIG. 3a shows the initial index stage of the preferred process in which a sheet of material is aligned in the apparatus. As shown, thermoplastic sheet 124 is located over the opening of mold cavity 108 by a conventional material placement apparatus (not shown) under control of controller 138 (shown in FIG. 1) in preparation for a thermoforming operation. In this initial stage, plug 114 and clamp 110 are spaced from mold bed 104 by an indexing apparatus including, in the preferred embodiment, indexing mechanisms 112 and 118 as shown in FIG. 1.

Figure 3B:
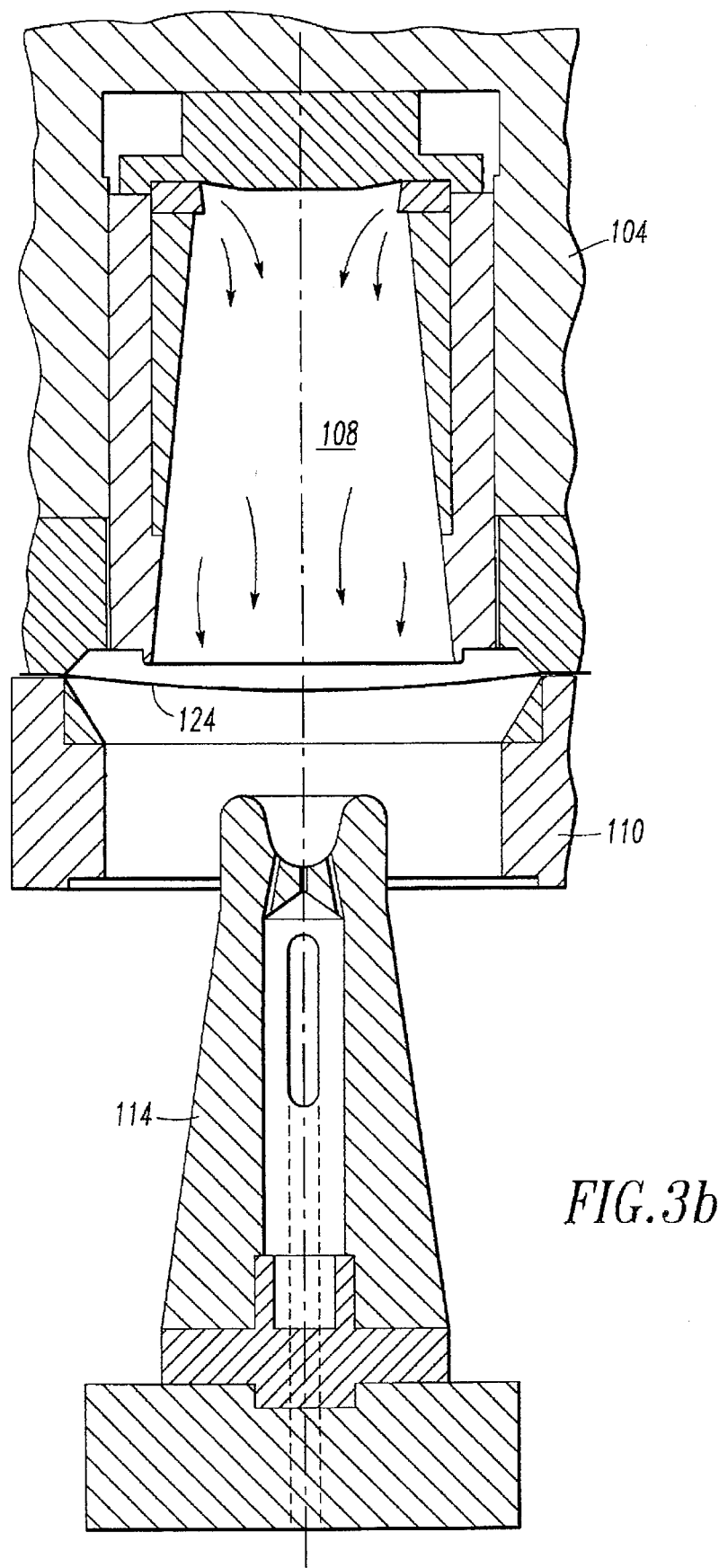

FIG. 3b shows a second, clamping and pre-billow stage, in which thermoplastic sheet 124 is clamped against mold bed 104 by clamp 110. Optionally, an increased air pressure may be provided in mold cavity 108 by the operation of valve assembly 120 to apply air from compressed air source 132 (shown in FIG. 1) to mold cavity 108 after clamping of clamp 110 to hold sheet 124 against mold bed 104. This optional increased air pressure outwardly biases sheet 124 against subsequent movement of plug 114 into mold cavity 108. The desired increased air pressure in mold cavity 108 may also be provided by the vacuum bleed mode operating in conjunction with the advancement of plug 114 as described previously.

Figure 3C:
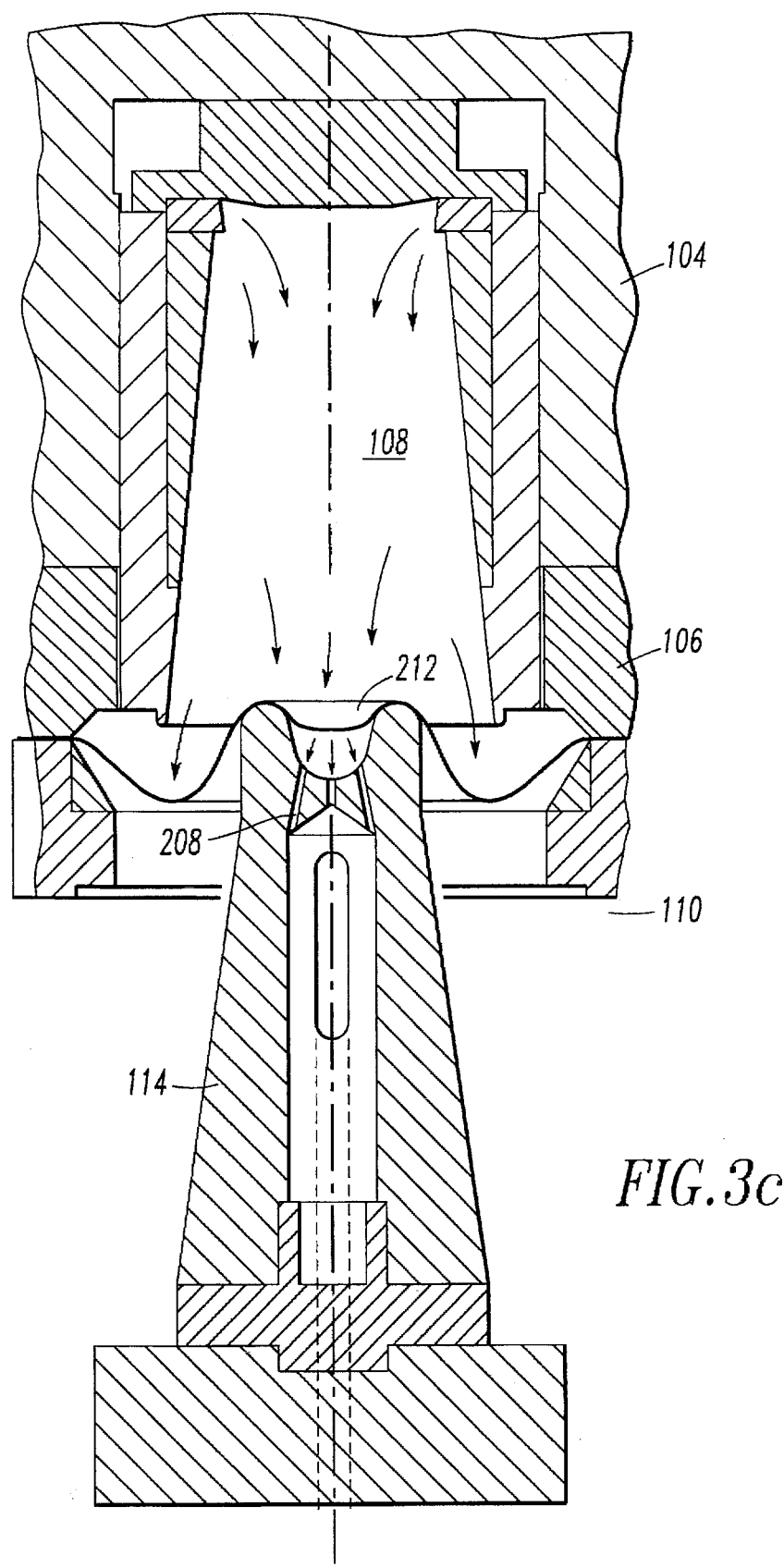

FIG. 3c shows a third, prestretch stage in which a level of air pressure greater than the pressure in the area of plug 114 is maintained in mold cavity 108. This increased pressure may be obtained in one of several ways. First, if increased pressure has been provided in the second step illustrated in FIG. 3b, this pressure may be maintained. Secondly, increased pressure may be provided merely by preventing the escape of air in mold cavity 108, rather than by positively applying pressure from an external source. If the escape of air from mold cavity 108 is prevented or limited, for example using the vacuum bleed mode described previously, increased pressure in mold cavity 108 will inherently occur when plug 114 forces sheet 124 into mold cavity 108. The positive air pressure in mold cavity 108 at the time of entry of plug 114 tends to produce a billow effect which stretches sheet 124 outwardly about plug 114 in a concentric ring pattern. Limitation of the escape of air from mold cavity 108 may be provided by closing valve assembly 120 entirely to prevent the escape of air from mold cavity 108, or a limited-rate air escape may be provided by connecting mold cavity 108 only partially to vacuum source 126 to produce a "vacuum bleed" mode of operation as described above.

As further shown in FIG. 3c, as plug 114 is indexed into stretching contact with sheet 124, controller 138 (shown in FIG. 1) controls valve assembly 122 (also shown in FIG. 1) to apply vacuum from vacuum source 126 through central air passage 204 and holes 208 and thus provide central prestretching of sheet 124 at the center of the previously described concentric billowed region of sheet 124. Specifically, sheet 124 is drawn into concave region 212 by the applied vacuum and thereby stretched to conform to concave region 212. Thus, sheet 124 is prestretched in a concentric wave pattern across at least its central area, corresponding to the bottom and lower side portions of the concave container formed by the present process. This concentric wave prestretching provides a substantial advantage in that it substantially eliminates any disc or slug of excess material in the bottom of the container, thus saving material, and improves material distribution, particularly caliper balance between the bottom and side walls of the formed item, thus increasing rigidity of the item.

Figure 3D:
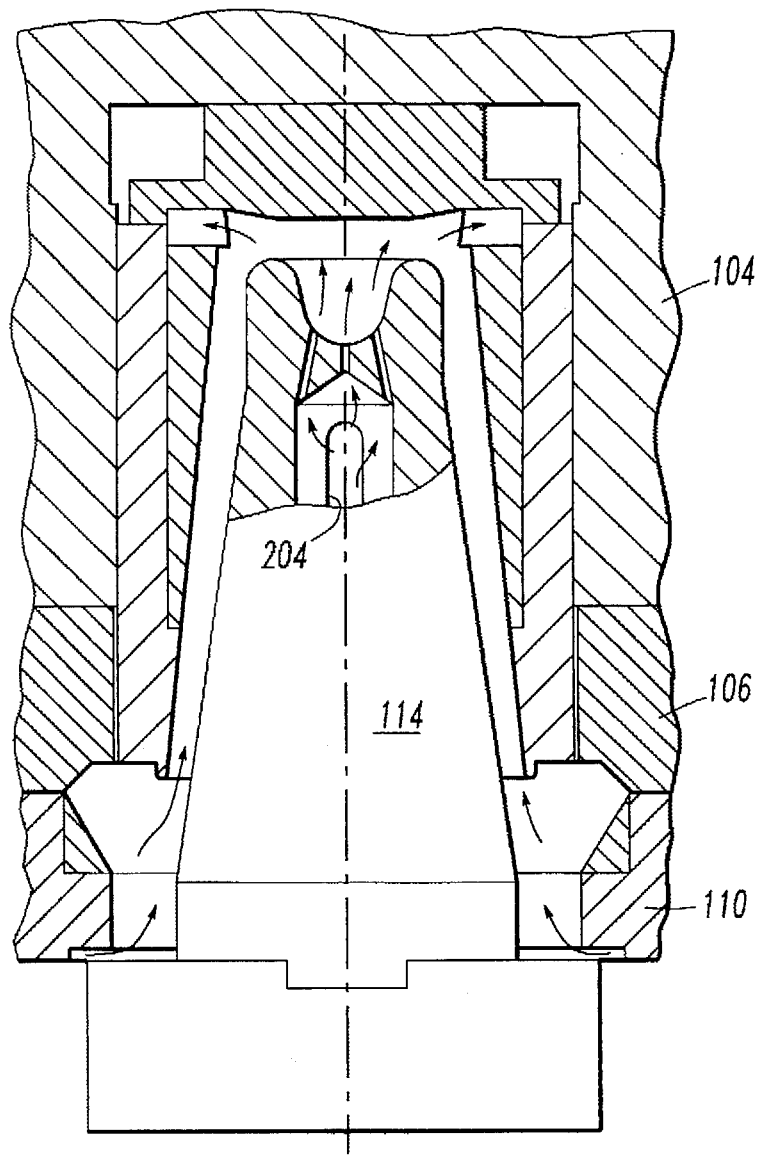

FIG. 3d shows a fourth, molding stage in which plug 114 indexes fully into mold cavity 108 of mold bed 104. Significantly, as noted previously, valve assembly 122 (shown in FIG. 1) provides a means for applying either vacuum or increased air pressure to the concave region 212 of plug 114. In the process stage shown in FIG. 3d, positive air pressure from compressed air source 132 (shown in FIG. 1) is applied by operation of valve assembly 122 (also shown in FIG. 1) through holes 208 of plug 114 to force sheet 124 out of concave region 212 and against the walls of mold cavity 108. Simultaneously, vacuum is applied in mold cavity 108 by operation of valve assembly 120 (shown in FIG. 1), thus drawing sheet 124 into conformance with the walls of mold bed 104. The application of positive air pressure from the concave region 212 and simultaneous vacuum on the other side of sheet 124 produces a faster, more accurate and more uniform forming process. It is the capability of selectively providing either positive pressure or vacuum to the concave region 212 of plug 114, as provided in the preferred embodiment of the present invention, that makes possible this improved operational characteristic.

Figure 3E:
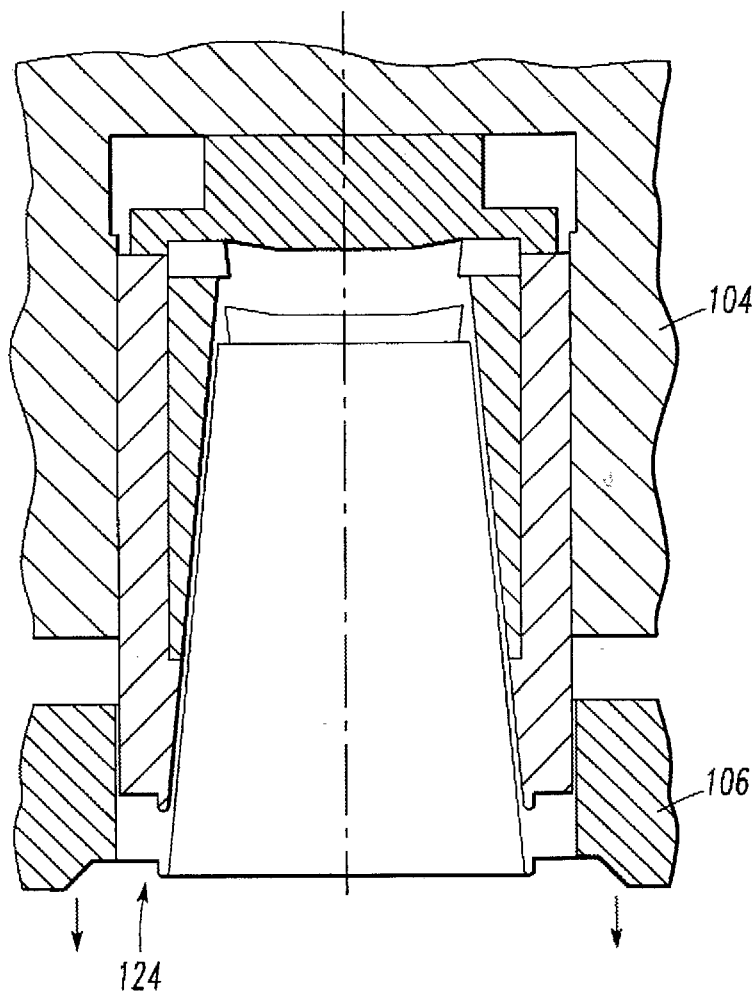

FIG. 3e is a final, stripping stage in which the thermoformed product is removed from the mold. Stripping mechanism 106 is indexed away from mold bed 104 under control of controller 138 (shown in FIG. 1), pulling the edges of the now-formed sheet 124 away from mold bed 104 and thus unseating the formed article (sheet 124) from mold bed 104.

In each stage, the operation of the valves and indexing apparatus and the timing of movements and pressure or vacuum application is precisely controlled by the controller 138 as shown in FIG. 1. The timing of pressure application and pressure levels provided can be advantageously adjusted by programming of controller 138 to produce an optimal product output.

Thus, a process and apparatus has been disclosed which in a preferred embodiment produces an improved thermoformed product by prestretching the plastic sheet in a concentric wave pattern and then forcibly pressing the sheet into a mold.

We claim:

1. Apparatus for plug-assisted thermoforming of an article, comprising:
   a mold having a cavity corresponding in shape to the article to be thermoformed, said mold having mold pressure control means associated therewith for providing air pressure differing from atmospheric pressure in the cavity of the mold;
   clamping means for selectively locating a heated thermoplastic sheet in a position proximate to said mold;
   plug assist means for prestretching said sheet and assisting insertion of said sheet into said mold, and including:
      a plug with an end portion, said plug shaped so that said end portion may be received by said mold cavity, said end portion being at least partially concave with a concave plug end surface thereon and at least one passage provided in said plug end surface to communicate with said concave portion of said end portion;
      pressure adjustment means operatively connected to said passage for selectively withdrawing air through said passage to create a partial vacuum in the region of said concave portion of said end portion, and for alternately selectively pressurizing said passage to create a positive pressure in the region of said concave portion of said end portion; and
      plug movement means for selectively advancing the plug in the direction of said end portion into said mold and for selectively withdrawing said plug from said mold.

2. The apparatus of claim 1 wherein said plug end surface has a plurality of said passages communicating with plug end surface and operatively connected to said pressure adjustment means.

3. The apparatus of claim 2 wherein said passages are arranged symmetrically with respect to said concave portion of said end portion.

4. The apparatus of claim 3 wherein there are nine said passages with eight of said passages arranged diametrically about the ninth said passage.

5. The apparatus of claim 1 wherein said pressure adjustment means operates to produce a vacuum drawing the sheet into said concave portion of said plug and subsequently operates after movement of said plug toward said mold to produce positive pressure forcing said sheet into contact with a surface of said mold cavity.

6. The apparatus of claim 1 wherein said mold pressure control means comprises mold prestretching means for producing positive pressure in the mold cavity in conjunction with advancement of said plug by said plug movement means.

7. The apparatus of claim 6 wherein said pressure adjustment means operates to produce a vacuum drawing the sheet into said concave portion of said plug and said mold prestretching means operates simultaneously to force said sheet into said concave portion of the plug.

8. The apparatus of claim 7 wherein said mold prestretching means further operates to stretch said sheet in an area concentric with said concave portion of said plug.

9. The apparatus of claim 8 wherein said apparatus prestretches said sheet in the form of a concentric wave to produce a plurality of concentric prestretched areas.

10. The apparatus of claim 9 wherein said thermoformed article is a generally cylindrical container with a bottom and side walls, and said concentric prestretched areas comprise a first prestretched area corresponding to said bottom and at least one prestretched area corresponding to said side walls.

11. The apparatus of claim i wherein said concave portion of said plug is surrounded by a convex lip smoothly joining said concave portion to a substantially cylindrical side wall portion of said plug.

12. The apparatus of claim 11 wherein said plug is generally shaped as the frustrum of a cone, with said substantially cylindrical side wall portion located to define the end portion of said plug at the end toward the apex of said cone.

13. The apparatus of claim 12 wherein said frustrum of said cone is substantially complementary to a sidewall of said mold cavity.

14. Apparatus for plug-assisted thermoforming of an article, comprising:

a mold having a cavity portion corresponding in shape to the article to be thermoformed, said mold having mold pressure control means associated therewith for selectively providing both partial vacuum pressure and a position prestretching pressure in the mold cavity;

clamping means for selectively locating a heated thermoplastic sheet in a position proximate to said mold;

a plug for prestretching said sheet and assisting insertion of said sheet into said mold, said plug shaped so that said end portion may be received by said cavity portion of said mold, said plug having an end portion with a concave plug end surface centrally located thereon, said concave surface surrounded at said end portion by a convex lip smoothly joining said concave portion to a substantially cylindrical outer sidewall portion of said plug, and a generally tapered shape corresponding to a frustrum of a cone, with said substantially cylindrical side wall portion located to define the end portion of said plug at the end toward the apex of said cone;

plug movement means for selectively advancing the plug in the direction of said end portion into said mold and for selectively withdrawing said plug from said mold;

prestretching control means connected to said mold pressure control means, said clamping means, and said plug movement means for clamping said sheet, advancing said plug into a prestretch position, and providing positive air pressure in said mold cavity to prestretch said sheet against said plug to form a plurality of concentric waves in said sheet prior to final vacuum thermoforming of said sheet in the mold cavity.

15. The apparatus of claim 14 wherein said plug comprises at least one passage provided in said plug end surface to communicate with said concave portion of said end portion.

16. The apparatus of claim 15 further comprising pressure adjustment means operatively connected to said passage for selectively withdrawing air through said passage to create a partial vacuum in the region of said concave portion of said end portion, and for alternately selectively pressurizing said passage to create a positive pressure in the region of said concave portion of said end portion.

17. The apparatus of claim 14 wherein said frustrum of said cone is substantially complementary to a sidewall of said mold cavity.

* * * * *